US012806720B2

(12) United States Patent
Strüben et al.

(10) Patent No.: US 12,806,720 B2
(45) **Date of Patent: *Nov. 24, 2026**

(54) FLUX AND SOLDER PASTE COMPRISING SAID FLUX

(71) Applicant: Heraeus Electronics GmbH & Co. KG, Hanau (DE)

(72) Inventors: Jan Strüben, Hanau (DE); Christian Loosz, Hanau (DE); Steffen Käss, Hanau (DE); Michael Neidert, Hanau (DE)

(73) Assignee: HERAEUS ELECTRONICS GMBH & CO. KG, Hanau (DE)

( * ) Notice: Subject to any disclaimer, the term of this patent is extended or adjusted under 35 U.S.C. 154(b) by 289 days.

This patent is subject to a terminal disclaimer.

(21) Appl. No.: 18/773,035

(22) Filed: Jul. 15, 2024

(65) Prior Publication Data

US 2025/0025970 A1 Jan. 23, 2025

(30) Foreign Application Priority Data

Jul. 20, 2023 (EP) .................................... 23186568

(51) Int. Cl.

*B23K 35/36* (2006.01)
*B23K 35/02* (2006.01)
*B23K 35/362* (2006.01)

(52) U.S. Cl.

CPC ........ *B23K 35/3618* (2013.01); *B23K 35/025* (2013.01); *B23K 35/3613* (2013.01); *B23K 35/362* (2013.01)

(58) Field of Classification Search

CPC .............. B23K 35/3618; B23K 35/025; B23K 35/3613; B23K 35/362

See application file for complete search history.

(56) References Cited

U.S. PATENT DOCUMENTS 5,985,456 A 11/1999 Zhou et al.
2025/0025968 A1* 1/2025 Neidert .............. B23K 35/3612

FOREIGN PATENT DOCUMENTS

| | | | |
|---|---|---|---|
| EP | 4144476 | A1 | 3/2023 |
| SU | 1668082 | A1 * | 8/1991 |
| SU | 1764913 | A1 * | 9/1992 |
| WO | 9821264 | A1 | 5/1998 |

OTHER PUBLICATIONS

EP 4144476 A1 machine translation (Year: 2023).*
SU 1668082 A1 machine translation (Year: 1991).*
SU 1764913 A1 machine translation (Year: 1992).*

* cited by examiner

*Primary Examiner* — Tima M. McGuthry-Banks
(74) *Attorney, Agent, or Firm* — Blank Rome LLP

(57) ABSTRACT

A flux consisting of: (i) 30 to 80 wt % of one or more different acidic oligoesters having an acid number in the range from 100 to 300 mg KOH/g and having a weight-average molecular weight $M_w$ in the range from 300 to 600, (ii) 10 to 50 wt % of at least one organic solvent, (iii) 0 to 15 wt % of one or more amines, and (iv) 0 to 10 wt % of one or more components other than components (i) to (iii); and, solder paste consisting of 80 to 92 wt % of one or more different solders and 8 to 20 wt % of the flux.

12 Claims, No Drawings

FLUX AND SOLDER PASTE COMPRISING SAID FLUX

CROSS-REFERENCE TO RELATED APPLICATIONS

This application claims priority pursuant to 35 U.S.C. 119(a) to European Application No. 23186568.4, filed Jul. 20, 2023, which application is incorporated herein by reference in its entirety.

FIELD

The present invention relates to a flux for solder pastes and to a solder paste comprising the flux, in particular for attaching electronic components to substrates.

BACKGROUND

Solder pastes, in particular soft solder pastes, are mainly used in the production of electronic circuits and are used to create a mechanical, electrical and thermal connection between an electronic component and a substrate, or more precisely, between the contact surfaces of the latter intended for this purpose.

Examples of electronic components within the meaning of the present patent application include diodes, LEDs (light emitting diodes), dies, IGBTs (insulated-gate bipolar transistors), MOSFETs (metal-oxide-semiconductor field-effect transistors), ICs (integrated circuits), sensors, heat sinks, resistors, capacitors, coils, connecting elements (e.g., clips), base plates, antennas, and the like.

Examples of substrates within the meaning of the present patent application include lead frames, PCBs (printed circuit boards), flexible electronics, ceramic substrates, metal-ceramic substrates such as DCB substrates (direct copper-bonded substrates), IMS (insulated metal substrate) and the like.

The electronic component is typically brought into contact with or applied to the substrate via the solder paste. The solder paste is heated in order to melt the solder (solder metal, solder alloy) in the paste by means of a reflow process, for example. After the solder has cooled and solidified, the electronic component and substrate are firmly bonded together.

In addition to solder powder, solder pastes typically contain flux. Fluxes are used, among other things, to dissolve the oxide layer on the surfaces of the solder powder, the electronic component and the substrate and thus ensure better wettability during the soldering process.

Fluxes that form part of solder pastes are typically based on natural resins, such as colophony in particular. Furthermore, organic solvents, buffering bases, such as amines, and activators, such as carboxylic acids or halogen compounds, are typically contained as components in such fluxes.

The quality of a solder joint and the storage stability of a solder paste depend, among other things, on the properties of the solder powder that forms part of the solder paste, such as its ball size and degree of oxidation. With advancing miniaturization in electronics, the development of solder powders is moving towards fine solder ball sizes; this allows the formulation of solder pastes that can be applied particularly finely structured. However, with finer solder powders, the storage stability (viscosity stability at room temperature) of solder pastes and their solderability under normal atmospheric conditions typically decreases significantly.

SUMMARY

The object of the invention is to provide a solder paste with improved storage stability and improved solderability in the presence of air, i.e., with good solderability, even without having to take special measures to exclude atmospheric oxygen, such as vacuum soldering or soldering under inert gas.

The applicant was able to develop a flux that achieves the object, or rather a solder paste comprising the flux that achieves the object. Accordingly, the invention consists in providing a flux consisting of (i) 30 to 80 wt % (% by weight), preferably 50 to 70 wt %, of one or more acidic oligoesters having an acid number in the range from 100 to 300 mg KOH/g and having a weight-average molecular weight $M_w$ in the range from 300 to 600, (ii) 10 to 50 wt %, preferably 20 to 40 wt %, of at least one organic solvent, (iii) 0 to 15 wt %, preferably 4 to 12 wt %, of one or more amines, and (iv) 0 to 10 wt % of one or more components other than components (i) to (iii).

DESCRIPTION

The term "acid number" used in this description and in the examples refers to an acid number (AV) that can be determined in mg KOH/g (milligrams KOH per gram) in accordance with DIN EN ISO 2114.

Unless otherwise stated, all standards cited in this description and in the examples are the current version at the time of the priority date of the present patent application.

The weight-average molecular weight $M_w$ mentioned in this description and in the examples can be determined in the usual manner known to the person skilled in the art by means of GPC, for example according to DIN 55672-1 (March 2016; crosslinked polystyrene as the immobile phase, tetrahydrofuran as the liquid phase, polystyrene standards, 23 °C).

Depending on the presence of components (iii) and/or (iv), the flux can accordingly consist of components (i) plus (ii), or (i) plus (ii) plus (iii), or (i) plus (ii) plus (iv), or (i) plus (ii) plus (iii) plus (iv), and, in each of these alternatives, the sum of the wt % of the respective components is 100 wt %.

As component (i), the flux according to the invention comprises 30 to 80 wt %, preferably 50 to 70 wt %, of one or more different acidic oligoesters having an acid number in the range from 100 to 300 mg KOH/g and having a weight-average molecular weight $M_w$ in the range from 300 to 600. Preferably, the acidic oligoester(s) of component (i) do not comprise any amino groups, i.e., neither primary, nor secondary, nor tertiary amino groups. Preferably, component (i) comprises one or more different acidic oligoesters having an acid number in the range from 200 to 250 mg KOH/g and having a weight-average molecular weight $M_w$ in the range from 400 to 550. Particularly preferably, component (i) comprises only one acidic oligoester having an acid number in the range from 200 to 250 mg KOH/g and having a weight-average molecular weight $M_w$ in the range from 400 to 550. A distinction is made herein between one acidic oligoester and several different acidic oligoesters. To avoid any misunderstanding, the term "one acidic oligoester" refers to a mixture of oligomers or an oligomeric polyester having a qualitatively and quantitatively defined structure, i.e., with a structure consisting of building blocks defined by type and quantity. As can already be seen from the mentioning of weight-average molecular weight $M_w$, the "one acidic oligoester" also has a molecular weight distribution, i.e., it is present as a mixture of oligomeric polyester molecules of different sizes. Accordingly, the term "several different acidic oligoesters" refers to a combination of different oligomer mixtures or to several differently structured oligomeric polyesters; each of these different oligomeric polyesters has a molar mass distribution.

The acidic oligoesters can be composed of one or more different low-molecular-weight polyols as hydroxyl building blocks and one or more different low-molecular-weight polycarboxylic acids as carboxyl building blocks.

The term "low-molecular-weight" used herein refers to compounds which are defined by their molecular and structural formula and which do not have a molar mass distribution.

The acidic oligoester(s) is/are preferably linear acidic oligoesters with one or two terminal carboxyl groups or a mixture of such oligoesters. The preferred linear acidic oligoesters can be composed of one or more different low-molecular-weight diols and one or more different low-molecular-weight dicarboxylic acids. In accordance with the foregoing, preferably neither the low-molecular-weight diols nor the low-molecular-weight dicarboxylic acids comprise any amino groups; i.e., the low-molecular-weight diols preferably do not comprise any amino alcohols (alcohol amines), and the low-molecular-weight dicarboxylic acids preferably do not comprise any dicarboxylic acids with amino groups in the molecule. Examples of low-molecular-weight diols include aliphatic and cycloaliphatic diols, such as ethylene glycol, 2-ethyl-1,3-hexanediol, 1,2- and 1,3-propylene glycol, 1,3-butanediol, 1,4-butanediol, 2,3-butanediol, 1,5-pentanediol, 1,6-hexanediol, trimethylhexanediol, hydrogenated bisphenols, cyclohexanediols, 1,4-cyclohexanedimethanol, neopentylglycol and butylethylpropanediol. Preferably, the low-molecular-weight diols are selected from the group consisting of low-molecular-weight cycloaliphatic diols. Examples of low-molecular-weight dicarboxylic acids include tetrahydrophthalic acid, maleic acid, fumaric acid, hexahydrophthalic acid, 1,3-cyclohexanedicarboxylic acid and 1,4-cyclohexanedicarboxylic acid, adipic acid, malonic acid, succinic acid, glutaric acid, pimelic acid, cork acid, azelaic acid, sebacic acid, undecanedioic acid, dodecanedioic acid and tridecanedioic acid. Preferably, the dicarboxylic acids are those selected from the group consisting of aromatic dicarboxylic acids, such as the isomeric phthalic acids, especially orthophthalic acid.

Processes for the production of acidic oligoesters by polycondensation of low-molecular-weight polyols as hydroxyl building blocks and low-molecular-weight polycarboxylic acids as carboxyl building blocks are well known to a person skilled in the art, i.e., a synthetic resin or polymer chemist. In the polycondensation typically carried out in the melt, water is split off during an esterification reaction; the water is removed from the reaction mixture, in particular by distillation, possibly azeotropically or with support by applying a vacuum. Of course, instead of polycarboxylic acid—if available—corresponding acid anhydride can be used, which can be esterified with the hydroxyl building block(s) by opening the ring.

As component (ii), the flux according to the invention comprises 10 to 50 wt %, preferably 20 to 40 wt %, of at least one organic solvent. Examples include diols, alcohols, ether alcohols and ketones which are liquid at 25 °C, in particular trimethylpropanol, 1,2-octanediol, 1,8-octanediol, 2,5-dimethyl-2,5-hexanediol, isobornylcyclohexanol, glycol ether, 2-ethyl-1,3-hexanediol, n-decyl alcohol, 2-methyl-2,4-pentanediol, terpineol and isopropanol as well as mixtures thereof. Examples of glycol ethers include mono-, di-, tripropylene glycol methyl ethers, mono-, di-, tripropylene glycol n-butyl ethers, mono-, di-, triethylene glycol n-butyl ethers, ethylene glycol dimethyl ethers, triethylene glycol methyl ethers, diethylene glycol dibutyl ethers, tetraethylene glycol dimethyl ethers and diethylene glycol monohexyl ethers, as well as mixtures thereof. To avoid misunderstandings, the diols mentioned here as examples relate to diols deliberately intentionally added as a type (ii) component when formulating the flux according to the invention, not to be confused with any unintentional and unavoidable impurities in the form of traces of diols used as hydroxyl building blocks in the synthesis of type (i) acidic oligoesters and not incorporated (not condensed) into the oligoester(s).

As component (iii), the flux according to the invention comprises 0 to 15 wt %, preferably 4 to 12 wt % of one or more amines, i.e., the flux according to the invention can comprise one or more amines or be free thereof, preferably one or more amines are comprised. Examples of amines include N,N,N',N'-tetramethylethylenediamine, N,N,N',N'-tetraethylethylenediamine, N,N,N',N'-tetrapropylethylenediamine, N-coco-1,3-diaminopropane, 1,6-diaminohexane, 1,7-diaminoheptane, 1,8-diaminooctane, 1,9-diaminononane and 1,10-diaminodecane, bis(2-ethylhexyl)amine, bis(2-methylhexyl)amine, diethylamine, triethylamine, cyclohexylamine, diethanolamine, triethanolamine, hydrogenated tallow-alkylamine, hydrogenated (tallow-alkyl) dimethylamine and hydrogenated bis(tallow-alkyl)methylamine.

As component (iv), the flux according to the invention comprises 0 to 10 wt % of one or more components that differ from components (i) to (iii), i.e., the flux according to the invention can comprise one or more type (iv) components or be free thereof. Examples of type (iv) ingredients include in particular thickening agents, but can also include activators, defoamers, wetting aids and/or stabilizers. One advantage of the flux according to the invention that should not be underestimated is however that it does not necessarily require activators, i.e., it can also be formulated without activators.

Examples of thickening agents include ethyl cellulose, hydrogenated castor oil, glycerol-tris-12-hydroxystearin and modified glycerol-tris-12-hydroxystearin.

Examples of low-molecular-weight carboxylic acids useful as activators include oxalic acid, adipic acid, malonic acid, succinic acid, glutaric acid, pimelic acid, cork acid, azelaic acid, sebacic acid, undecanedioic acid, dodecanedioic acid and tridecanedioic acid. To avoid misunderstandings, the dicarboxylic acids mentioned here as examples relate to low-molecular-weight carboxylic acids deliberately added as a type (iv) component when formulating the flux according to the invention, not to be confused with any unintentional and unavoidable impurities in the flux according to the invention in the form of traces of carboxylic acids used as carboxyl building blocks in the synthesis of type (i) acidic oligoesters and not incorporated (not condensed) into the oligoester(s).

Examples of halogen-containing compounds useful as activators include aniline hydrochloride, glutamic acid hydrochloride, diethanolamine hydrochloride, diethanolamine hydrobromide, triethanolamine hydrochloride, triethanolamine hydrobromide and trans-2,3-dibromo-2-butene-1,4-diol.

Preferably, the flux according to the invention, i.e., the entire flux consisting of the components (i) plus (ii), or (i)

plus (ii) plus (iii), or (i) plus (ii) plus (iv), or (i) plus (ii) plus (iii) plus (iv), has a flux acid number (FAV) in the range from 100 to 250 mg KOH/g, preferably in the range from 120 to 220 mg KOH/g. The flux acid number mentioned in this description and in the examples can be determined in accordance with IPC TM-650 2.3.13 (dated 06/2004 Revision A). The flux acid number is formed at least substantially or completely from the carboxyl groups of component (i) and the carboxyl groups optionally contributed by component (iv).

The invention further comprises providing a solder paste comprising 80 to 92 wt % of one or more different solders and 8 to 20 wt % of a flux according to the invention, i.e., a flux according to the invention in one of its aforementioned embodiments. The sum of the percentages by weight of the solder(s) and of the flux according to the invention is 100 wt %.

As mentioned, the solder paste according to the invention comprises 80 to 92 wt % of one or more different solders, in particular solder(s) based on tin (solder alloys comprising at least 80 wt %, preferably at least 83 wt %, in particular 90 to 99.5 wt % tin) or based on bismuth/tin (solder alloys comprising 50 to 60 wt % bismuth and 40 to 50 wt % tin).

It is preferred that the solder has a liquidus temperature in a range from 150 to 350 °C, preferably in a range from 180 to 300 °C.

The solder or solders are present in the solder paste according to the invention as solder powder, as is usual for solder pastes. The ball size of the solder balls making up the solder powder can correspond to any of the classifications according to the IPC J-STD-005A standard, i.e., the solder paste according to the invention can have solder balls of any type of ball size within the type range of T1 to T7.

Preferably, the solder paste according to the invention has a viscosity of 50 to 250 Pa·s. The viscosity mentioned in this description and in the examples can be determined using a plate-plate rheometer having a plate diameter of 50 mm and a measuring gap of 400 μm (for example the plate-plate rheometer Physica MCR 150 from Anton-Paar) at 25 °C and at a shear rate of 10 $s^{-}$ A further object of the present invention is a method for producing a solder paste according to the invention.

The method for producing a solder paste according to the invention comprises the following steps:

mixing the components of a flux according to the invention; and adding a solder powder as mentioned above.

The solder powder is preferably added, in a plurality of portions while stirring, to a prepared mixture of the components of the flux according to the invention, generally without heating.

The solder paste according to the invention can be used to connect electronic components to substrates. It can also be used to produce solder deposits on substrates.

When connecting electronic components to substrates, the contact surface of the substrate and the contact surface of the electronic component are contacted via the solder paste according to the invention.

A method of attaching an electronic component to a substrate using a solder paste according to the invention can comprise the following steps:

a) providing an electronic component with a contact surface, b) providing a substrate with a contact surface, c) applying the solder paste to the contact surface of the electronic component and/or the contact surface of the substrate, d) contacting the contact surface of the electronic component to the contact surface of the substrate using the solder paste; and e) heating the solder paste above the liquidus temperature of the solder and then allowing the solder to cool and solidify, forming a firm bond between the electronic component and the substrate.

Steps a) and b) are self-explanatory and require no further explanation.

In step c), the solder paste according to the invention can be applied to one or both contact surfaces by means of conventional methods known to a person skilled in the art, for example by screen or stencil printing or dispensing or jetting.

In step d), the contact surfaces of the electronic component and of the substrate can be bonded together using the solder paste. In other words, a sandwich arrangement can be created from the electronic component and the substrate, with the solder paste between the contact surfaces thereof.

In step e), the sandwich assembly can be soldered by heating the solder paste above the liquidus temperature of the solder so that a solid connection is formed between the electronic component and the substrate via the solder paste after the solder has subsequently cooled and solidified. The solder paste is preferably heated in such a way that the solder passes into its liquid phase, but without damaging the electronic component and/or the substrate. The sandwich assembly or rather the solder paste is preferably heated to a temperature that is 5 to 60 °C, preferably 10 to 50 °C, above the liquidus temperature of the solder.

Advantageously, the solder paste comprising the flux according to the invention allows soldering according to step e) regardless of the ball size of the solder powder used in the solder paste in air, i.e., even when working with particularly fine solder powder of the type range 6 to 7 according to the aforementioned standard IPC J-STD-005A.

EXAMPLES

Example 1.1 (Preparation of an acidic oligoester from 1,4-cyclohexanedimethanol and o-phthalic acid): 100 g of 1,4-cyclohexanedimethanol and 150 g of o-phthalic acid were heated to 145 °C in a beaker with constant stirring until a clear and bubble-free composition was obtained. The resulting composition was then allowed to cool at room temperature. The acid number of the oligoester obtained in this manner was 215 mg KOH/g. The weight-average molecular weight $M_w$ was 494.

Example 1.2 (Preparation of an acidic oligoester from glycerol and o-phthalic acid): 100 g glycerol and 150 g o-phthalic acid were heated to 145 °C in a beaker with constant stirring until a clear and bubble-free composition was obtained. The resulting composition was then allowed to cool at room temperature. The acid number of the resulting oligoester was 220 mg KOH/g. The weight-average molecular weight $M_w$ was 508.

Example 1.3 (Preparation of an acidic oligoester from 2-ethyl-1,3-hexanediol and o-phthalic anhydride): 100 g of 2-ethyl-1,3-hexanediol and 150 g of o-phthalic anhydride were heated to 145 °C in a beaker with constant stirring until a clear and bubble-free composition was obtained. The resulting composition was then allowed to cool at room temperature. The acid number of the resulting oligoester was 210 mg KOH/g. The weight-average molecular weight $M_w$ was 497.

Example 2 (Preparation of Fluxes)

Each of the acidic oligoesters from Examples 1.1, 1.2 and 1.3 was dissolved at 110 °C in diethylene glycol monohexyl ether according to Table 1. The mixture was then cooled to 80 °C, and further ingredients were added and homogenized according to Table 1.

Example 3 (Preparation and Testing of Solder Pastes)

To prepare the solder pastes, 11 parts by weight of flux were mixed with 89 parts by weight of solder powder (SnAgCu: Sn 96.5 wt. %, Ag 3.0 wt. %, Cu 0.5 wt. %, type 6 according to the IPC J-STD-005A standard) to form solder pastes. Their wetting properties (solderability in an air atmosphere) and viscosity stability at room temperature were tested.

Testing the Wetting Capacity

The wetting properties of the solder pastes were assessed using the melting test in accordance with the IPC-TM-650 (1/95) standard test method 2.4.45 in an air atmosphere. For this purpose, the solder pastes to be tested were applied to copper sheets (20 mm×20 mm×0.5 mm). If the copper sheets had an oxide layer on the surface, they were sanded to a bright metallic finish with P600 grit sandpaper and cleaned with alcohol. Copper sheets which had a bright and clean surface were only cleaned with alcohol. The prepared copper sheets were printed using a stencil. To do this, the template was pressed firmly onto the copper sheet so that the openings in the template were in the middle of the copper sheet. The solder paste to be tested was placed on a Japan spatula and spread over the openings of the stencil, first lightly and then with a little more pressure, until there was no more solder paste on the stencil. The stencil was then carefully removed while retaining the pattern defined by the stencil. The printed copper sheet was placed on a first heating plate, which was at 200 °C (i.e., set to a temperature below the liquidus temperature of the solder), for 2 minutes and then immediately placed on a second heating plate at a temperature 50 °C above the liquidus temperature of the solder. After the solder paste or solder had melted, the copper sheet was left on the second heating plate for another 5 seconds and then removed and cooled down.

After the solder paste had cooled, it was assessed whether it had melted into spots that corresponded to the size of the openings in the stencil or into a plurality of small spots, and whether the solder paste had sharp edges after melting. It was also assessed whether the surface was glossy or matte.

The solder pastes were divided into four classes:

Class 1: The remelted area was larger than the area previously printed with solder paste.

Class 2: The remelted surface corresponded to the surface previously printed with solder paste.

Class 3: The remelted area was smaller than the area previously printed with solder paste (slight dewetting visible).

Class 4: The solder paste had formed one or more solder balls and had not wetted the copper sheet or had not completely melted.

Viscosity Stability Test at Room Temperature

First, the initial viscosity of the freshly prepared solder pastes was determined at 25 °C and a shear rate of 10 $s^{-1}$ using a plate-plate rheometer (Physica MCR 150 from Anton-Paar; plate diameter 50 mm, measuring gap 400 μm). The solder pastes were then each stored at room temperature (23 °C) in a sealed container and measured again at intervals of 10 days in each case, as previously stated. Before the respective viscosity measurement, each solder paste was briefly mixed homogeneously by hand using a spatula. The viscosity stability after 400 days of storage was evaluated as follows:

Viscosity change of up to 15% compared to initial viscosity: Class 1

Viscosity change of >15 to 25% compared to initial viscosity: Class 2

Viscosity change of >25% compared to initial viscosity: Class 3

The following table shows the composition of the fluxes in wt % (1 to 6 according to the invention; V1 and V2 comparative fluxes) and the test results obtained with the solder pastes formulated with them.

| Flux | 1 | 2 | 3 | 4 | 5 | 6 | V1 | V2 |
|---|---|---|---|---|---|---|---|---|
| Oligoester 1.1 | 60 | 50 | 40 | 50 | | | | |
| Oligoester 1.2 | | | | | 60 | | | |
| Oligoester 1.3 | | | | | | 60 | | |
| Colophony resin ($M_w$ 375, AV 150 mg KOH/g) | | | | | | | 40 | |
| Colophony resin ($M_w$ 375, AV 240 mg KOH/g) | | | | | | | | 44 |
| Diethylene glycol monohexyl ether | 27 | 37 | 47 | 27 | 27 | 27 | 40 | 35 |
| N,N,N',N'-tetramethylethylenediamine | 10 | 10 | 10 | 10 | 10 | 10 | 10 | 5 |
| Dodecanedioic acid | | | | 10 | | | 7 | 13 |
| Thickener (Disparlon 6500 from King Industries) | 3 | 3 | 3 | 3 | 3 | 3 | 3 | 3 |
| Wetting capacity | 2 | 3 | 3 | 2 | 2 | 2 | 4 | 2 |
| Viscosity stability | 1 | 1 | 1 | 2 | 1 | 2 | 2 | 3 |

What is claimed is:

1. A flux consisting of:

(i) 30 to 80 wt % of one or more acidic oligoesters having an acid number in the range from 100 to 300 mg KOH/g and having a weight-average molecular weight Mw in the range from 300 to 600;

(ii) 10 to 50 wt % of at least one organic solvent;

(iii) 0 to 15 wt % of one or more amines; and (iv) 0 to 10 wt % of one or more components other than components (i) to (iii).

2. The flux according to claim 1, wherein the one or more acidic oligoesters have an acid number in the range from 200 to 250 mg KOH/g and a weight-average molecular weight $M_w$ in the range from 400 to 550.

3. The flux according to claim 1, wherein the one or more acidic oligoesters are composed of one or more low-molecular-weight polyols as hydroxyl building blocks and one or more low-molecular-weight polycarboxylic acids as carboxyl building blocks.

4. The flux according to claim 1, wherein the one or more acidic oligoesters are linear acidic oligoesters having one terminal carboxyl group, linear acidic oligoesters having two terminal carboxyl groups, or a mixture thereof.

5. The flux according to claim 4, wherein the linear acidic oligoesters are composed of one or more low-molecular-weight diols and one or more low-molecular-weight dicarboxylic acids.

6. A solder paste consisting of 80 to 92 wt % of one or more solders and 8 to 20 wt % of a flux according to claim 1.

7. The solder paste according to claim 6, wherein the one or more acidic oligoesters have an acid number in the range from 200 to 250 mg KOH/g and a weight-average molecular weight $M_w$ in the range from 400 to 550.

8. The solder paste according to claim 6, wherein the one or more acidic oligoesters are composed of one or more low-molecular-weight polyols as hydroxyl building blocks and one or more low-molecular-weight polycarboxylic acids as carboxyl building blocks.

9. The solder paste according to claim 6, wherein the one or more acidic oligoesters are linear acidic oligoesters having one terminal carboxyl group, linear acidic oligoesters having two terminal carboxyl groups, or a mixture thereof.

10. The solder paste according to claim 9, wherein the linear acidic oligoesters are composed of one or more low-molecular-weight diols and one or more low-molecular-weight dicarboxylic acids.

11. A connection between an electronic component and a substrate, the connection prepared from a solder paste according to claim 6.

12. A solder deposit on a substrate, the solder deposit prepared from a solder paste according to claim 6.

* * * * *